United States Patent Office 3,092,615
Patented June 4, 1963

3,092,615
AZO DYESTUFFS CONTAINING A QUATERNIZED PYRAZOLONE RADICAL
Georges Raymond Henry Mingasson and Marcelle Henriette Ferrand, Paris, France, assignors to Compagnie Francaise des Matieres Colorantes, Paris, France, a French company
No Drawing. Filed June 29, 1960, Ser. No. 39,434
Claims priority, application France July 1, 1959
6 Claims. (Cl. 260—163)

The present invention concerns new azo dyestuffs, process for their preparation and their use in the colouration of polymers or co-polymers based on polyacrylonitrile.

The new azo dyestuffs of the present invention can be represented by the general formula:

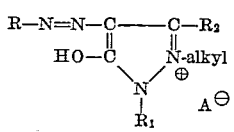

in which R represents the radical of a diazotisable amine, $R_1$ represents a hydrogen atom or an alkyl or aryl group, $R_2$ represents an atom of hydrogen or an alkyl, aryl or alkoxycarbonyl group and A represents an anionic radical. The new azo dyestuffs can be obtained by coupling a diazo derivative of a diazotisable base, free from solubilizing groups, with a pyrazolone of the general formula:

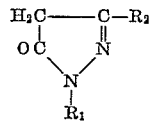

in which $R_1$ and $R_2$ have the meanings given above and transforming the dyestuff obtained into a quaternary ammonium salt. The diazotisable bases can be substituted, with halogen atoms, or alkyl, alkoxy, nitro or cyano groups.

The coupling can be effected in a medium consisting of sodium acetate-acetic acid, or in an alkaline medium. The transformation into quaternary ammonium salts can be effected by the action of an alkylating agent, for example a dialkyl sulphate, an alkyl halide or an arylsulphonyl ester on the dyestuff in solution in an inert solvent.

The quaternary character of the dyestuffs thus obtained is confirmed by the fact that they are soluble in water, while the original dyestuffs are practicably insoluble in an aqueous acid medium; on the other hand they are not precipitated from their aqueous solutions by the addition of a mineral base such as caustic soda.

The new azo dyestuffs of the invention dye synthetic fibres based on polymers or co-polymers of acrylonitrile in bright shades going from greenish yellow to red, which are very fast to light and moisture tests. They possess moreover the property that they do not dye wool.

The following examples illustrate the invention without limiting it. The parts are expressed in weight except where otherwise indicated.

Example 1

10 parts of dyestuff obtained by coupling the diazo derivative of aniline with 3-methyl-5-pyrazolone are dissolved under reflux in 125 parts of dry chlorobenzene. There is added slowly with agitation 16 parts of dimethyl sulphate diluted with 10 parts of chlorobenzene. Boiling is effected for 1½ hours and the solvent is driven off by steam. The solution of the dyestuff is filtered, and after cooling the dyestuff is precipitated by the addition of salt and zinc chloride. It is filtered and dried.

Example 2

A dyebath is prepared by dissolving 0.5 part of the dyestuff of Example 1 in 2 parts of water. There is added 2 parts of sulphuric acid and the dyebath is heated to 50° C. There is introduced into this bath 100 parts of the fibre based on acrylonitrile, known on the market as "Orlon." The bath is brought to boiling and dyeing is effected for an hour at this temperature. The fibre is coloured a greenish yellow shade. Under the same conditions of dyeing the dyestuff does not dye wool.

Other examples are summarised in the following table, in which the shades indicated are the shades obtained on synthetic fibres based on polymers or co-polymers of acrylonitrile.

| Example | Diazotised Base | Copulent | Shade |
|---|---|---|---|
| 3 | o-toluidine | 3-methyl-5-pyrazolone. | yellow. |
| 4 | p-toluidine | do | golden yellow. |
| 5 | m-xylidine | do | reddish yellow. |
| 6 | p-xylidine | do | golden yellow. |
| 7 | o-chloraniline | do | Do. |
| 8 | m-chloraniline | do | greenish yellow. |
| 9 | p-chloraniline | do | golden yellow. |
| 10 | o-anisidine | do | orange yellow. |
| 11 | p-anisidine | do | orange. |
| 12 | o-nitraniline | do | reddish yellow. |
| 13 | 4-nitro-2-methyl-aniline. | do | Do. |
| 14 | 4-nitro-2-methoxy-aniline. | do | orange yellow. |
| 15 | 2:5-dichloroaniline. | do | greenish yellow. |
| 16 | β-naphthylamine | do | orange. |
| 17 | aniline | 3-ethoxycarbonyl-5-pyrazolone. | golden yellow. |
| 18 | p-anisidine | do | scarlet. |
| 19 | aniline | 3-phenyl-5-pyrazolone. | golden yellow. |
| 20 | p-toluidine | do | reddish yellow. |
| 21 | p-anisidine | do | orange red. |
| 22 | aniline | 1-phenyl-3-methyl-5-pyrazolone. | greenish yellow. |
| 23 | p-toluidine | do | golden yellow. |
| 24 | p-anisidine | do | orange. |

Example 25

By working as in Example 1, but by replacing the dimethyl sulphate by 25 parts of the methyl ester of paratoluene sulphonic acid there is obtained, after removal of the solvent in steam, a solution of dyestuff which is precipitated by salting and addition of zinc chloride. The dyestuff thus obtained has the same characteristics as the dyestuff of Example 1.

We claim:
1. Azo dyestuff of the general formula:

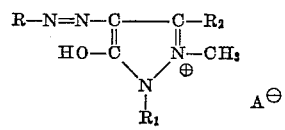

in which R represents a member selected from the group consisting of phenyl, naphthyl, methyl substituted phenyl, methoxy substituted phenyl, chloro substituted phenyl, and nitro substituted phenyl radicals, $R_1$ represents a member selected from the group consisting of the hydrogen atom and the phenyl radical, $R_2$ represents a member selected from the group consisting of methyl, phenyl and ethoxycarbonyl groups, and A represents a monovalent anion.

2. The compound of the formula

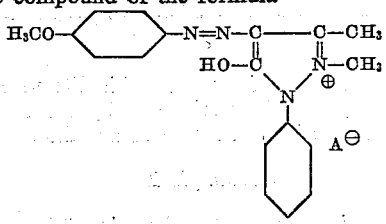

where A represents a monovalent anion.

3. The compound of the formula

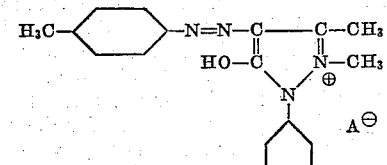

where A represents a monovalent anion.

4. The compound of the formula

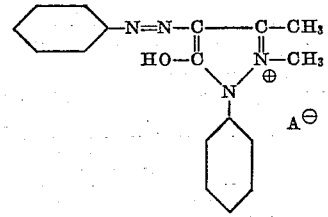

where A represents a monovalent anion.

5. The compound of the formula

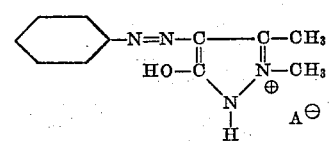

where A represents a monovalent anion.

6. The compound of the formula

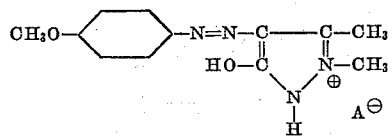

where A represents a monovalent anion.

References Cited in the file of this patent

UNITED STATES PATENTS 2,883,373    Bossard et al.    Apr. 21, 1959
2,972,508    Kruckenberg et al.    Feb. 21, 1961